06. COMPOSITIONS, COATING OR PLASTIC

90

Cross Reference

Examiner 1,416,684

UNITED STATES PATENT OFFICE.

LEWIS N. BROWER AND PETER WERLE, OF SELLERSBURG, INDIANA.

PLASTIC COMPOSITION FOR USE AS A COATING FOR WALLS OF BUILDINGS.

1,416,684.     Specification of Letters Patent.     Patented May 23, 1922.

No Drawing.     Application filed May 9, 1921. Serial No. 468,083.

*To all whom it may concern:*

Be it known that we, LEWIS N. BROWER and PETER WERLE, citizens of the United States of America, and residents of Sellersburg, in the county of Clark and State of Indiana, have invented certain new and useful Improvements in Plastic Composition for Use as a Coating for Walls of Buildings, of which the following is a specification.

This invention relates to composition of matter and particularly to plastic compound for use as a coating for walls of buildings, the said invention having for its object the production of a wall plaster which is easily appliable and which has advantages, in that it produces a better finish and has greater density when dry than known wall plasters now in use, it having been found that the wall plaster forming the subject of this invention has great durability and it is comparatively inexpensive to produce.

With the foregoing and other objects in view, the invention consists in the ingredients, proportions and the manner of compounding to be hereinafter more fully set forth and claimed.

In carrying the invention into practice, we employ Brixment cement, Portland cement, lime, sand, hair fiber, and pulverized alum, and these ingredients are used preferably in the proportions as follows: 1090 parts Brixment cement, 535 parts Portland cement, 185 parts lime, 185 parts sand, 5 parts hair fiber and ½ part pulverized alum.

The ingredients compounded as stated, results in the production of a dry composition which, in the said state, forms a commodity which may be manufactured and sold for use in the production of a plastic coating for the interior of buildings and the like.

It has been found in practice that by employing one hundred pounds of the composition above indicated with three gallons of water, or approximately so, a plastic composition is produced which can be readily spread and treated as is commonly done by plasterers, and when the said coating is left to dry, it speedily hardens and the surfaces have the characteristics above enumerated. It is difficult to give an exact proportion of water for producing the plastic composition, as conditions change somewhat, due to the weather and the character of the material, as that also changes under differing weather conditions.

The term "Brixment cement" as employed in this specification refers to a cement which is composed of 6000 parts of hydraulic lime and 380 parts of lime made from high grade lime rock, the said lime being mixed with 105 parts of oil and a suitable amount of water to make a plastic composition, the amount of water averaging about 24 gallons to the proportions just stated. The foregoing ingredients of the composition are mixed together to produce a stiff plastic composition. It is then allowed to cool and dry for 15 or 18 hours. The composition is then removed from the hopper and re-ground, the product being that which is referred to herein as Brixment cement.

We claim:

A composition for the production of plaster consisting of Brixment cement, Portland cement, lime, sand, hair fiber, and pulverized alum substantially in the proportions as follows: 1090 parts Brixment cement, 535 parts Portland cement, 185 parts lime, 185 parts sand, 5 parts hair fiber, and ½ part pulverized alum.

LEWIS N. BROWER.
PETER WERLE.